(12) United States Patent
Young et al.

(10) Patent No.: US 11,999,464 B2
(45) Date of Patent: Jun. 4, 2024

(54) CONNECTOR TO CONNECT A CENTER WING BOX TO A BULKHEAD OF AN AIRCRAFT

(71) Applicant: The Boeing Company, Chicago, IL (US)

(72) Inventors: Jenny Young, Seattle, WA (US); Daniel Cox, Seattle, WA (US); Steven David Ingham, Everett, WA (US); Kyle Alexander Johnson, Everett, WA (US); Mark Ronald McLaughlin, Snohomish, WA (US); Paul Hungwai Lai, Arcadia, CA (US)

(73) Assignee: THE BOEING COMPANY, Arlington, VA (US)

( * ) Notice: Subject to any disclaimer, the term of this patent is extended or adjusted under 35 U.S.C. 154(b) by 151 days.

(21) Appl. No.: 17/577,863

(22) Filed: Jan. 18, 2022

(65) Prior Publication Data
US 2022/0234716 A1 Jul. 28, 2022

Related U.S. Application Data

(60) Provisional application No. 63/142,173, filed on Jan. 27, 2021.

(51) Int. Cl.
*B64C 1/26* (2006.01)
*B64C 1/10* (2006.01)

(52) U.S. Cl.
CPC . *B64C 1/26* (2013.01); *B64C 1/10* (2013.01)

(58) Field of Classification Search
CPC .... B64C 1/26; B64C 1/10; B64C 1/12; B64C 1/18; B64C 1/069; B64C 7/00
See application file for complete search history.

(56) References Cited

U.S. PATENT DOCUMENTS

| 2,140,672 | A | * | 12/1938 | Gray | B64D 37/02 |
| | | | | | 114/224 |
| 5,086,996 | A | | 2/1992 | Roeder et al. | |
| 7,546,979 | B1 | * | 6/2009 | Estell | B64C 1/26 |
| | | | | | 244/131 |
| 8,016,234 | B2 | | 9/2011 | Müller et al. | |
| 8,770,518 | B2 | * | 7/2014 | Guittard | B64C 1/26 |
| | | | | | 244/131 |
| 9,199,717 | B2 | * | 12/2015 | Bogiatzis | B64C 7/00 |
| 9,731,808 | B2 | | 8/2017 | Charles et al. | |

(Continued)

FOREIGN PATENT DOCUMENTS

| DE | 102006042748 A1 * | 3/2008 | ............... B64C 1/10 |
| DE | 102015116591 A1 * | 3/2017 | ............... B64C 1/18 |

(Continued)

*Primary Examiner* — Joshua J Michener
*Assistant Examiner* — Ryan Andrew Yankey
(74) *Attorney, Agent, or Firm* — COATS & BENNETT, PLLC

(57) ABSTRACT

A connector to connect a center wing box to a bulkhead of an aircraft. The connector includes a panel with a first edge positioned at the center wing box, an opposing second edge positioned at the bulkhead, and a central section. A first flexible seal extends across the panel and provides for relative movement between the first edge and the central section. A second flexible seal extends across the panel and provides for relative movement between the second edge and the central section.

20 Claims, 10 Drawing Sheets

(56) References Cited

U.S. PATENT DOCUMENTS

| | | | |
|---|---|---|---|
| 10,589,836 | B2 | 3/2020 | Sankrithi et al. |
| 10,604,276 | B2 | 3/2020 | Mindock et al. |
| 10,773,787 | B2 | 9/2020 | Griess et al. |
| 10,871,232 | B2 * | 12/2020 | Laverne .................... B64C 3/26 |
| 11,479,336 | B2 | 10/2022 | Leibov et al. |
| 2009/0137196 | A1 | 5/2009 | Klug et al. |
| 2009/0236472 | A1 * | 9/2009 | Wood ........................ B64C 1/18 |
| | | | 244/119 |
| 2009/0236473 | A1 * | 9/2009 | Rawdon .................... B64C 1/08 |
| | | | 244/120 |
| 2009/0283637 | A1 | 11/2009 | Nolla |
| 2011/0233334 | A1 | 9/2011 | Stephen |
| 2012/0267478 | A1 | 10/2012 | Dazet |
| 2012/0280083 | A1 * | 11/2012 | Dazet .................... B29C 70/845 |
| | | | 264/249 |
| 2012/0305709 | A1 * | 12/2012 | Bense .................... F16B 19/08 |
| | | | 411/361 |
| 2014/0059860 | A1 | 3/2014 | Hsueh |
| 2014/0196831 | A1 * | 7/2014 | Ayres ................ E04F 15/02435 |
| | | | 156/349 |
| 2016/0185451 | A1 * | 6/2016 | Bellet ....................... B64C 1/18 |
| | | | 244/129.1 |
| 2018/0113425 | A1 * | 4/2018 | Nakashima ........ G05B 19/4207 |
| 2019/0061906 | A1 | 2/2019 | Ewing |
| 2019/0112034 | A1 * | 4/2019 | Bellet .................... B64C 25/16 |
| 2019/0112035 | A1 * | 4/2019 | Bellet .................... B64C 25/04 |
| 2020/0108908 | A1 | 4/2020 | Cominsky et al. |
| 2020/0189714 | A1 * | 6/2020 | Murphy .................. B64F 5/10 |
| 2020/0207455 | A1 * | 7/2020 | Gauthie .................. B64C 3/26 |
| 2021/0188418 | A1 * | 6/2021 | Leibov ..................... B64C 1/10 |
| 2022/0212773 | A1 | 7/2022 | Vukosav et al. |
| 2022/0227474 | A1 | 7/2022 | Vukosav et al. |
| 2022/0234715 | A1 * | 7/2022 | Leibov .................... B64F 5/10 |
| 2022/0234716 | A1 | 7/2022 | Young et al. |
| 2023/0148389 | A1 * | 5/2023 | Orteu ..................... B64C 25/14 |
| | | | 244/102 R |

FOREIGN PATENT DOCUMENTS

| | | | | |
|---|---|---|---|---|
| EP | 2239195 | A1 | 10/2010 | |
| FR | 2894225 | A1 * | 6/2007 | .............. B64C 1/26 |
| WO | 2009056643 | A2 | 5/2009 | |
| WO | 2018203190 | A1 | 11/2018 | |
| WO | WO-2021032658 | A1 * | 2/2021 | .......... B64C 1/0009 |

* cited by examiner

CONNECTOR TO CONNECT A CENTER WING BOX TO A BULKHEAD OF AN AIRCRAFT

RELATED APPLICATIONS

This application claims priority from U.S. Provisional App. No. 63/142,173, filed 27 Jan. 2021, the disclosure of which is incorporated by reference herein in its entirety.

TECHNOLOGICAL FIELD

The present disclosure relates generally to the field of aircraft and, particularly, to a connector that connects a center wing box to a bulkhead.

BACKGROUND

The structural features of an aircraft include a fuselage that includes the structural core of the aircraft and a wing assembly that forms and supports the wings. The wing assembly includes wing boxes that are the primary load carrying structure of the wings and a center wing box. The center wing box is connected to each of the wing boxes and is located in the fuselage between the wing boxes.

The center wing box experiences stresses such as tension, compression, shear and torsion due to aerodynamic forces from the wings while in flight, and due to the weight of the wings themselves and from the fuel contained within the wings when the aircraft is on the ground. The center wing box supports the wing boxes and transmits the forces from the wings to the fuselage.

Prior designs include the center wing box rigidly connected to the forward fuselage. The rigid connection may induce very high loads due to the difference in relative displacement between the two structures (this phenomenon is less critical at the upper wing connection but very critical at the lower wing connection). To accommodate for these forces, the prior designs include additional structural elements, such as titanium forgings including an underwing longeron to carry these large loads. However, these additional structures are expensive and also add weight to the aircraft that reduces the efficiency. These additional structures have experienced premature fatigue cracking that require rework and/or replacement. Further, these structures can be located within the aircraft in positions that are difficult to access. This makes replacement more difficult and requires greater amounts of time that keep the aircraft out of service.

Further, the structural features provide for some aircraft to be manufactured in a modular fashion. Different sections of the aircraft can be manufactured separately and then brought together and assembled. For example, the wing assembly can be manufactured separately from the fuselage. During the assembly process, a mostly complete nose to tail fuselage is lowered onto a complete tip to tip wing and then connected together. This can enable high production rates and save factory space and assembly costs. This modular approach requires a design that provides for connecting the wing assembly to the fuselage.

SUMMARY

One aspect is directed to a connector to connect a center wing box to a bulkhead of an aircraft. The connector comprises a panel comprising a first edge positioned at the center wing box, an opposing second edge positioned at the bulkhead, and a central section. A first flexible seal extends across the panel and provides for relative movement between the first edge and the central section. A second flexible seal extends across the panel and provides for relative movement between the second edge and the central section.

In another aspect, the first flexible seal is spaced apart on the panel from the second flexible seal.

In another aspect, each of the first flexible seal and the second flexible seal are constructed from a flexible membrane material.

In another aspect, the panel comprises a first flange that comprises the first edge and an opposing inner edge with the inner edge connected to the first flexible seal, a second flange that comprises the second edge and an opposing inner edge with the inner edge connected to the second flexible seal, and the central section connected to inner edges of each of the first flexible seal and the second flexible seal.

In another aspect, a first support comprising a plurality of first stiffener arms is attached to the center wing box and the central section with the first stiffener arms configured to prevent interference with the first flexible seal, and a second support comprising a plurality of second stiffener arms attached to the bulkhead and the central section with the second stiffener arms configured to prevent interference with the second flexible seal.

In another aspect, the first and second stiffener arms are aligned in pairs along a length of the panel with the first and second stiffener arms of each of the pairs positioned in an overlapping configuration on opposing sides of the panel.

In another aspect, lug and clevis joints with pins pivotally connect the first stiffener arms to the center wing box and pivotally connect the second stiffener arms to the bulkhead.

In another aspect, the lug and clevis joints provide for movement of the first stiffener arms relative to the center wing box and the second stiffener arms relative to the bulkhead.

In another aspect, closeout panels are positioned on lateral sides of the panel with the closeout panels comprising pressure panels aligned at opposing angular orientations relative to the panel to structurally connect the panel to the fuselage.

One aspect is directed to a connector to connect a center wing box to a bulkhead of an aircraft. The connector comprises a panel sized to extend across a gap formed between the center wing box and the bulkhead. The panel comprises: a central section sized to extend across the gap with the central section comprising a first edge and an opposing second edge; a first flange pivotally connected to the first edge at a first flexible seal with the first flange configured to be connected to the center wing box; a second flange pivotally connected to the second edge at a second flexible seal with the second flange configured to be connected to the bulkhead; a first support mounted to the center wing box and to a first side of the central section; and a second support mounted to the bulkhead and to a second side of the central section.

In another aspect, each of the first flexible seal and the second flexible seal extend across an entire width of the panel.

In another aspect, the first support comprises a plurality of stiffener arms spaced apart across the width of the panel with each of the stiffener arms comprising a first end configured to be connected to the center wing box and an opposing second end positioned at and connected to the central section.

In another aspect, the first support is configured to prevent interference with the first flexible seal and the second support is configured to prevent interference with the second flexible seal.

In another aspect, each of the first flexible seal and the second flexible seal are straight and are aligned parallel.

One aspect is directed to a method of connecting a center wing box to a bulkhead of an aircraft. The method comprises: attaching a first flange of a panel to the center wing box; attaching a second flange of the panel to the bulkhead; positioning a central section of the panel along a gap formed between the center wing box and the bulkhead; aligning a first flexible seal that connects the first flange to the central section along the center wing box; and aligning a second flexible seal that connects the second flange to the central section along the bulkhead.

In another aspect, the method further comprises aligning the central section at a downward angle with the first flange positioned vertically above second flange.

In another aspect, the method further comprises attaching a plurality of first stiffener arms across a width of the panel with each of the first stiffener arms mounted to the center wing box and the central section, and attaching a plurality of second stiffener arms across the width of the panel with each of the second stiffener arms mounted to the bulkhead and the central section.

In another aspect, the method further comprises attaching the first stiffener arms to a first side of the panel and the second stiffener arms to an opposing second side of the panel.

In another aspect, the method further comprises attaching the first stiffener arms and the second stiffener arms to the central section without interfering with the first flexible seal and the second flexible seal.

In another aspect, attaching the second flange of the panel to the bulkhead comprises attaching the second flange to an upper chord of the bulkhead.

In another aspect, the method further comprises attaching the first flange to an upper panel of the center wing box.

The features, functions and advantages that have been discussed can be achieved independently in various aspects or may be combined in yet other aspects, further details of which can be seen with reference to the following description and the drawings.

DETAILED DESCRIPTION

Figure 1:
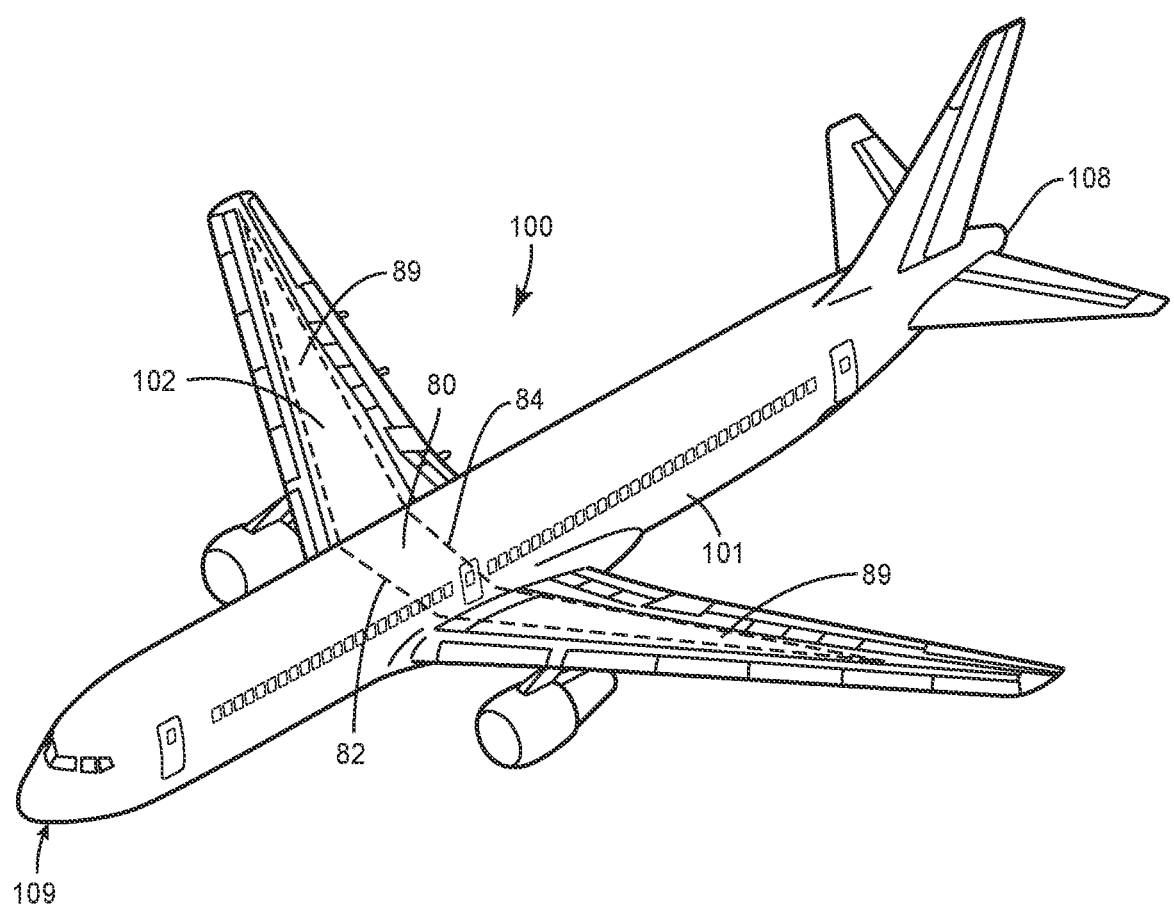
FIG. 1 is a perspective view of an aircraft.

As seen in FIG. 1, an aircraft 100 includes a fuselage 101 with a nose 109 and a tail 108. A wing assembly 102 is connected to the fuselage 101. The wing assembly 102 includes a center wing box 80 and outer wing boxes 89. The center wing box 80 is positioned within the fuselage 101 and is connected to and supports the outer wing boxes 89. The center wing box 80 includes a front spar 82 and a rear spar 84.

Figure 2:
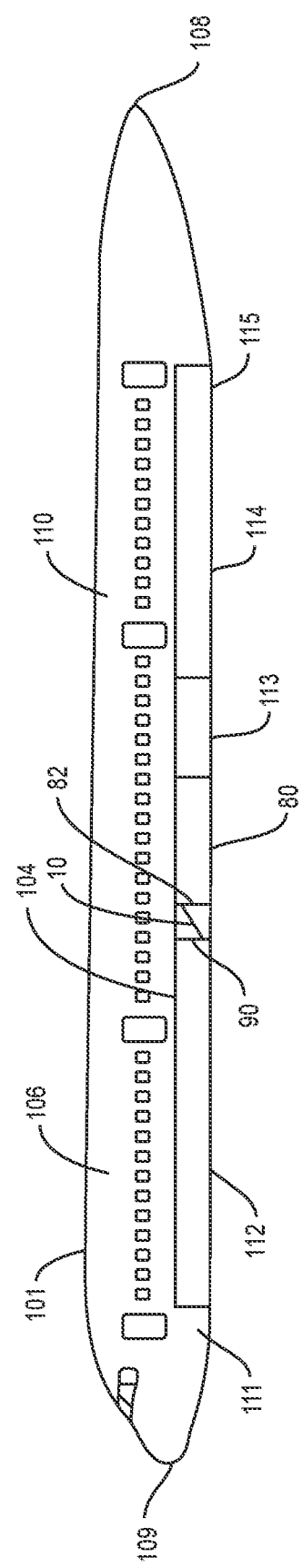
FIG. 2 is a side schematic view of a fuselage of an aircraft.

FIG. 2 illustrates a side schematic view of the fuselage 101 with the outer wing box 89 removed for clarity. The fuselage 101 includes an elongated shape and extends between the tail 108 and nose 109. In one example as illustrated in FIG. 2, the fuselage 101 is divided into an upper section 110 and a lower section 111. The upper section 110 includes a cabin area 106 with a floor 104. The upper section 110 includes various components to provide for transporting passengers, such as but not limited to seats, overhead storage, lavatories, and various other amenities.

The lower section 111 is positioned below the floor 104 of the upper section 110. The lower section 111 includes a forward cargo deck 112 for holding cargo on either the right or left side of the fuselage 101. A main landing gear wheel well 113 is positioned in a rear section of the fuselage 101 and a lower aft hold 114 that includes an aft cargo hold or deck is positioned aft of the main landing gear wheel well 113.

A bulkhead 90 is located aft of the forward cargo deck 112. The bulkhead 90 extends upward a limited distance from the lower portion of the fuselage 101. In one example, a top chord of the bulkhead 90 is positioned vertically below the floor 104. The center wing box 80 is located aft of and spaced away from the bulkhead 90. A connector 10 connects the center wing box 80 to a bulkhead 90. The bulkhead 90 offset from the center wing box 80 facilitates the assembly process when the aircraft 100 is manufactured in separate assemblies. This offset positioning facilitates rapid wing to body join when a mostly complete fuselage 101 is lowered onto a fully complete wing assembly 102. This supports a higher rate of production than would be available in other designs.

In the illustrated embodiment, the aircraft 100 is a commercial aircraft with the upper section 110 configured for passengers and flight crew and the lower section 111 configured for cargo storage and aircraft equipment/structural components. The design with a connector 10 that connects the center wing box 80 to the bulkhead 90 is also applicable in various other aircraft 100, including but not limited to various commercial and non-commercial aircraft. These aircraft 100 can include the same or different configurations for storing cargo and/or passengers.

Figure 3:
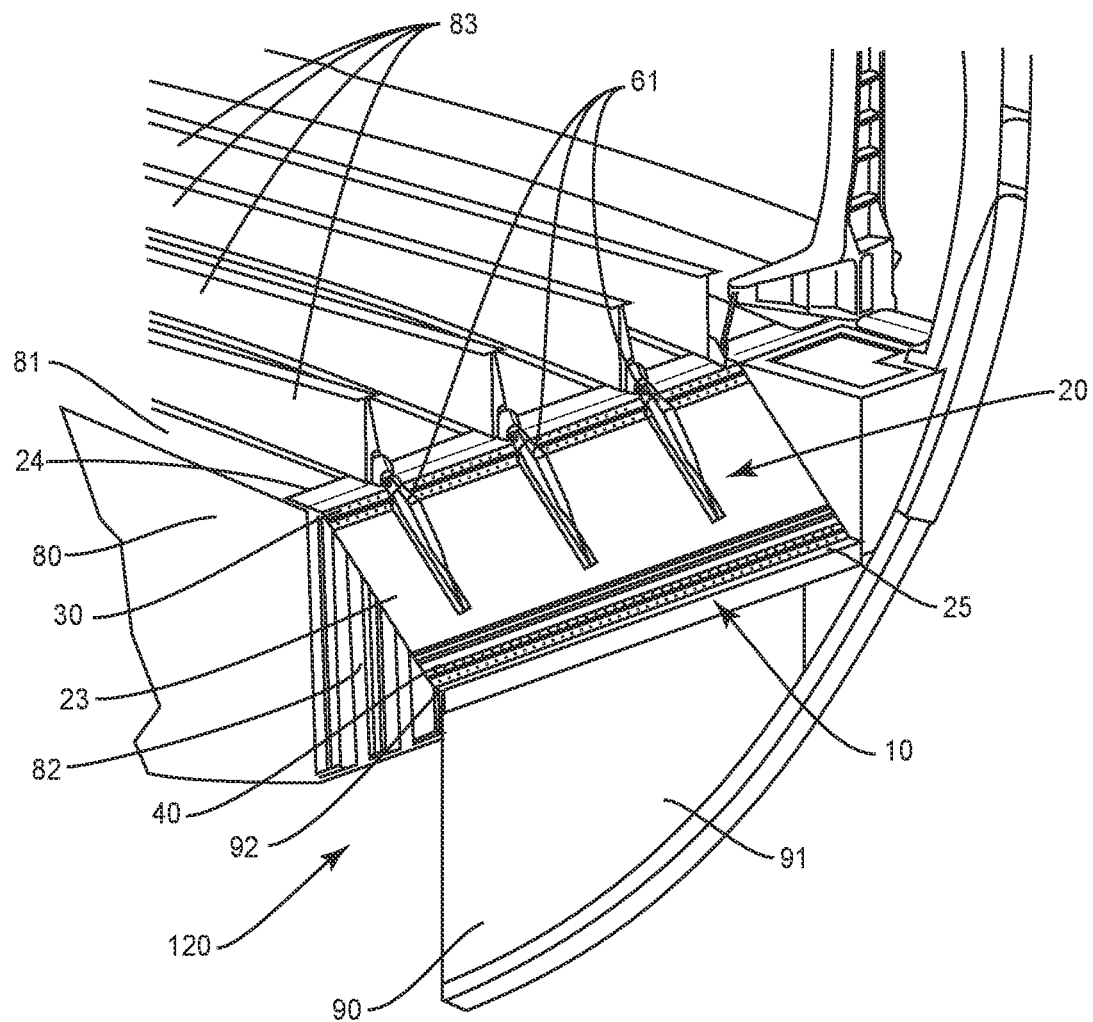
FIG. 3 is a partial perspective view of a connector that connects a center wing box to a bulkhead of an aircraft.

FIG. 3 illustrates a forward section of the center wing box 80 positioned in proximity to the bulkhead 90. The center wing box 80 includes an upper panel 81 and a front spar 82. Beams 83 can extend along the upper panel 81 across a width of the fuselage 101. The bulkhead 90 is positioned forward from the front spar 82 of the center wing box 80. The bulkhead 90 includes panels 91 with a curved shape that conform to the substantially rounded sectional shape of the fuselage 101. A deck 92 forms a chord that extends across the fuselage 101. In one example, both the panels 91 of the bulkhead 90 and the front spar 82 of the center wing box 80 are aligned substantially vertically within the fuselage 101.

In other examples, one or more of the panels 91 and front spar 82 are aligned at non-vertical angles.

A gap 120 is formed between the center wing box 80 and the bulkhead 90. The size of the gap 120 can vary depending upon the designs of the fuselage 101 and/or wing assembly 102. The connector 10 extends across the gap 120 and connects to each of the center wing box 80 and the bulkhead 90. The connector 10 is attached to the center wing box 80 and the bulkhead 90 to allow specific directions of relative motion between the wing assembly 102 and the fuselage 101.

The connector 10 decouples some interaction between the wing assembly 102 and fuselage 101 that occurs during various flight, ground, and/or thermal conditions thereby relieving stresses on the aircraft 100 due to the difference in relative displacement between the two structures, while at the same time the connector 10 allows the wing assembly 102 and the fuselage 101 to support internal pressure loads and allows the wing assembly 102 to support fuselage 101 loads. The connector 10 also enables a rapid connection of the wing assembly 102 and fuselage 101 during assembly. The connector 10 accommodates the gap 120 formed between the center wing box 80 and the bulkhead 90.

Figure 4:
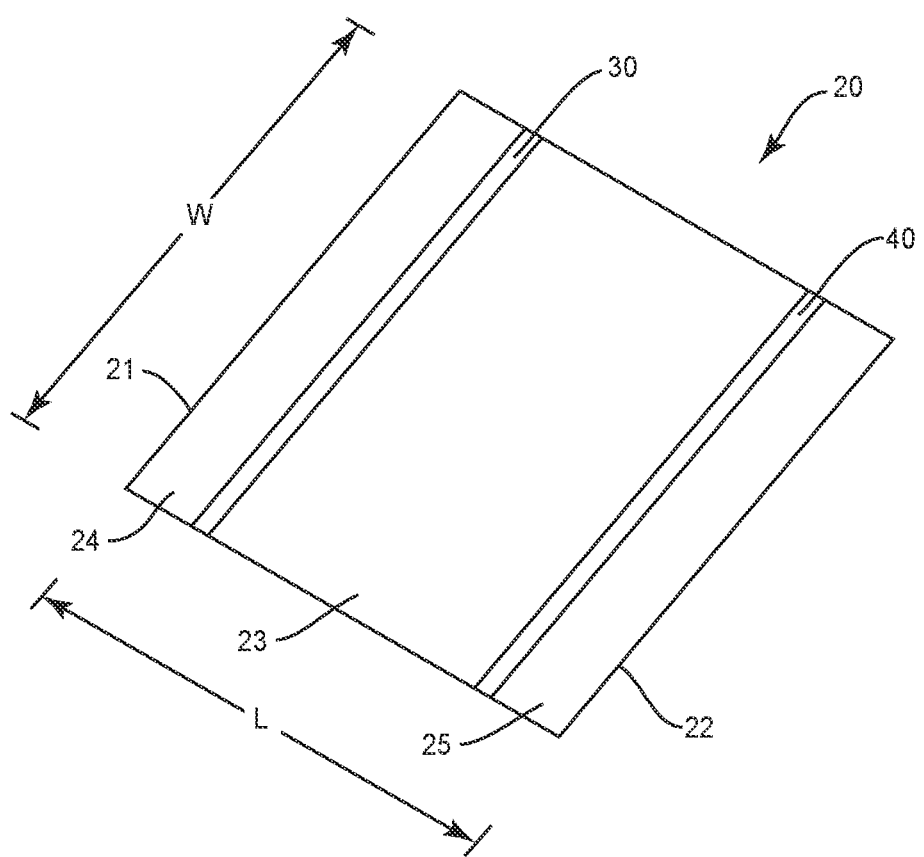
FIG. 4 is schematic diagram of a panel for connecting a center wing box to a bulkhead of an aircraft.

The connector 10 includes a panel 20 that is connected to each of the center wing box 80 and bulkhead 90 and that spans across the gap 120. FIG. 4 schematically illustrates the panel 20 that includes a first flange 24 with a first edge 21, a second flange 25 with a second edge 22, and an intermediate central section 23. The panel 20 includes a length L measured between the first and second edges 21, 22, and a width W measured between opposing lateral edges. The panel 20 includes a length L to extend along the gap 120 with the first edge 21 connected to the center wing box 80 and the second edge 22 connected to the bulkhead 90. The panel 20 also includes a first flexible seal 30 that extends across the width W and that provides for relative movement between the first edge 21 of the first flange 24 and the central section 23. A second flexible seal 40 that extends across the width W and provides for relative movement between the second edge 22 of the second flange 25 and the central section 23.

Figure 5:
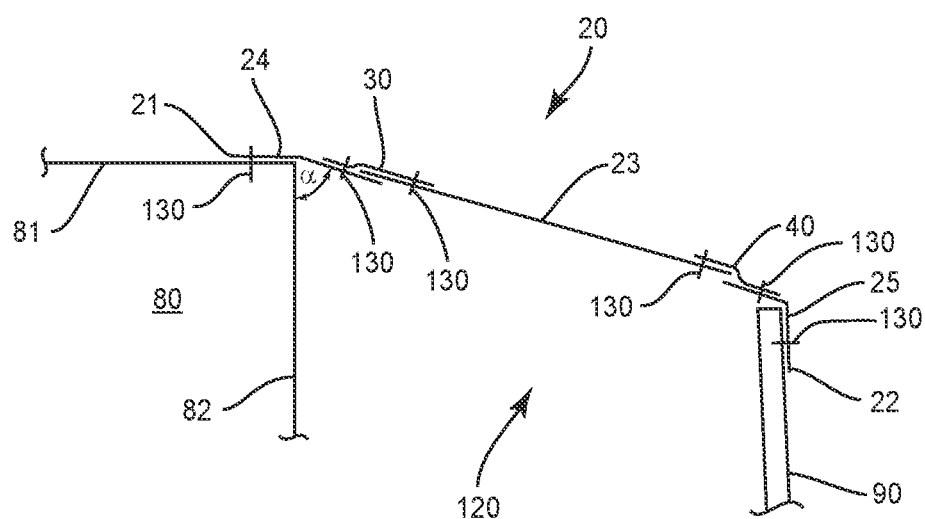
FIG. 5 is a schematic side view of a panel connecting a center wing box to a bulkhead of an aircraft.

FIG. 5 schematically illustrates the connection of the first and second flexible seals 30, 40. Each of the first and second flexible seals 30, 40 are formed by a silicone rubber strip sized to extend across the width W of the panel 20. In one example, each of the first and second flexible seals 30, 40 are straight and aligned parallel to one another. The first flexible seal 30 overlaps with and is connected to the first flange 24 and the central section 23. The second flexible seal 40 overlaps with and is connected to the second flange 25 and the central section 23. Fasteners 130 connect the first and second flexible seals 30, 40 respectively to the central section 23 and the first and second flanges 24, 25. Fasteners 130 further connect the first flange 24 to the center wing box 80 and the second flange 25 to the bulkhead 90. Fasteners 130 can include but are not limited to rivets, screw, and bolts. The flexible seals 30, 40 can be constructed from a variety of different materials, including but not limited to silicone rubber, vinyl, nitrile, latex, and combinations thereof.

In one example as illustrated in FIG. 5, the first and second flexible seals 30, 40 are attached to an upper surface respectively of the central section 23 and the first and second flanges 24, 25. In other examples, one or more of the first and second flexible seals 30, 40 are attached to a lower surface of the central section 23 and the first and second flanges 24, 25.

In another example, the central section 23 is spaced away from the first flange 24 by a gap. The flexible seal 30 spans the gap and is connected to each of the central section 23 and the first flange 24. In another example, the central section 23 is spaced away from the second flange 25 and the second flexible seal 40 spans the gap and connects to each of the central section 23 and the second flange 25.

In one example as illustrated in FIG. 5, the central section 23 overlaps with the first flange 24 at the first flexible seal 30. The first flange 24 and the central section 23 abut together and slide across one another during relative movement between the first flange 24 and the central section 23. In one example, the overlapping sections of the central section 23 and the first and second flanges 24, 25 are flat to facilitate relative movement. The first flexible seal 30 is positioned on a top edge of the first flange 24 and the central section 23 at the overlapping area. Similarly, the central section 23 overlaps with the second flange 25 at the second flexible seal 40. The central section 23 abuts against and slides across the second flange 25 during the relative movement. The second flexible seal 40 is positioned over the overlapping area.

The central section 23, the first flange 24, the second flange 25 are each rigid and can be constructed from a variety of materials. Materials include but are not limited to aluminum, steel, titanium, and fiber reinforced composite or metallic material, such as a carbon fiber reinforced polymer (CFRP) material. Fiber reinforced composite materials additionally or alternatively may be described as, or referred to as, fiber reinforced polymers, or plastics. As used herein, a fiber reinforced composite material should be understood to include at least an epoxy or other polymer or binding material together with fibers, such as (but not limited to) carbon fibers, glass fibers, boron fibers, para-aramid (e.g., Kevlar®) fibers, and/or other fibers. The use of carbon fiber materials provides for lower corrosion and fatigue cracking when compared to metallic materials. The carbon fiber materials are also able to be exposed to moisture that can accumulate in this area of the aircraft 100 and lead to corrosion in other materials. Further, carbon fiber is better able to handle the significant cyclic loading that occurs during operation of the aircraft 100. Carbon fiber is also less likely to have fatigue cracking. Further, the location of the connector 10 makes it difficult to access after the aircraft 100 is assembled thus design concerns that minimize issues are appreciated. The central section 23 and flanges 24, 25 can have the same or different constructions.

The panel 20 is positioned at a downward sloping angle with the first flange 24 that is connected to the center wing box 80 being vertically higher than the second flange 25 that is connected to the bulkhead 90. The central section 23 is positioned at an angle α as illustrated in FIG. 5. The angled slope provides for moisture that accumulates in the area to run off of the connector 10.

The connector 10 can also include first supports 60 that connect the panel 20 to the center wing box 80 and second supports 70 that connect the panel 20 the bulkhead 90. The first supports 60 have a cantilevered structure and are connected to the center wing box 80 and extend outward and connect to and support the central section 23. The second supports 70 also include a cantilevered structure and are connected to the bulkhead 90 and extend outward and are connected to the central section 23. Both the first and second supports 60, 70 are configured to prevent interference with the first and second seals 30, 40.

Figure 6:
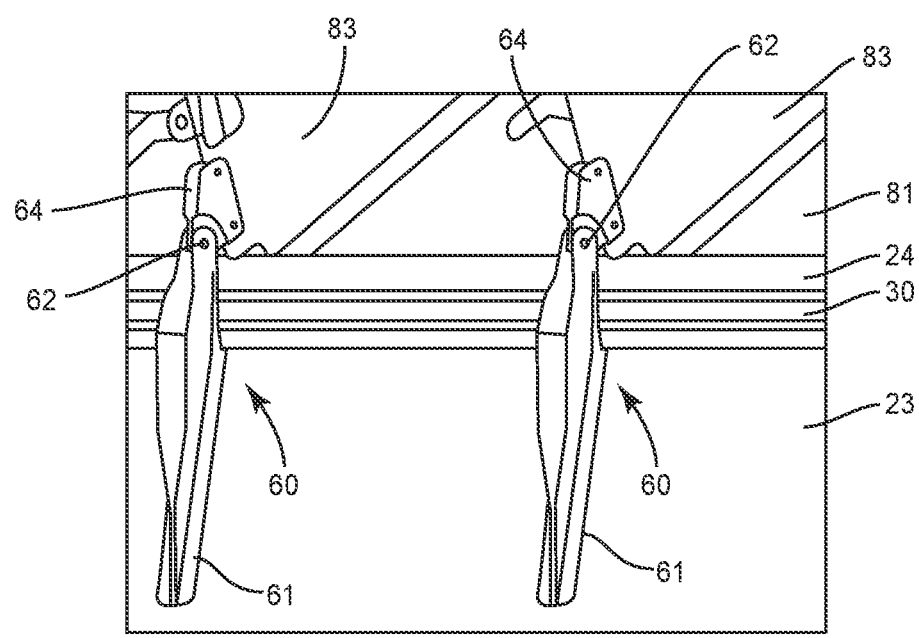
FIG. 6 is a perspective view of first supports connected to a panel and to a center wing box of an aircraft.

As illustrated in FIG. 6, each of the first supports 60 include an arm 61 that is connected to the central section 23 and a mount 64 that is connected to the center wing box 80 via overwing beams 83. The arm 61 is mounted to the central section 23 away from the seal 30. This positioning ensures that the arm 61 does not impede the movement of the panel 20 relative to the center wing box 80. In one example, the arm 61 is positioned in proximity to the lower edge of the flexible seal 30. The mount 64 is secured to the center wing box 80. In one example as illustrated in FIG. 6, the mounts 64 are connected to overwing beams 83 that are spaced apart across the width of the center wing box 80. In one example, the front edge of the beams 83 that secure the mounts 64 are aligned substantially perpendicular to the front spar 82. A connector 62 secures the arm 61 to the mount 64. The connector 62 provides for the arm 61 to pivot relative to the mount 64. In one example, the connector 62 is a pin that extends through the arm 61 and mount 64. In one example, a spherical bearing is included that provides for the relative movement between the arm 61 and the mount 64. In one example, the end of the arm 61 is a clevis with a forked shape that extends on opposing sides of the mount 64. The connector 62 extends through the clevis and the mount 64 and provides for the pivoting movement.

Figure 7:
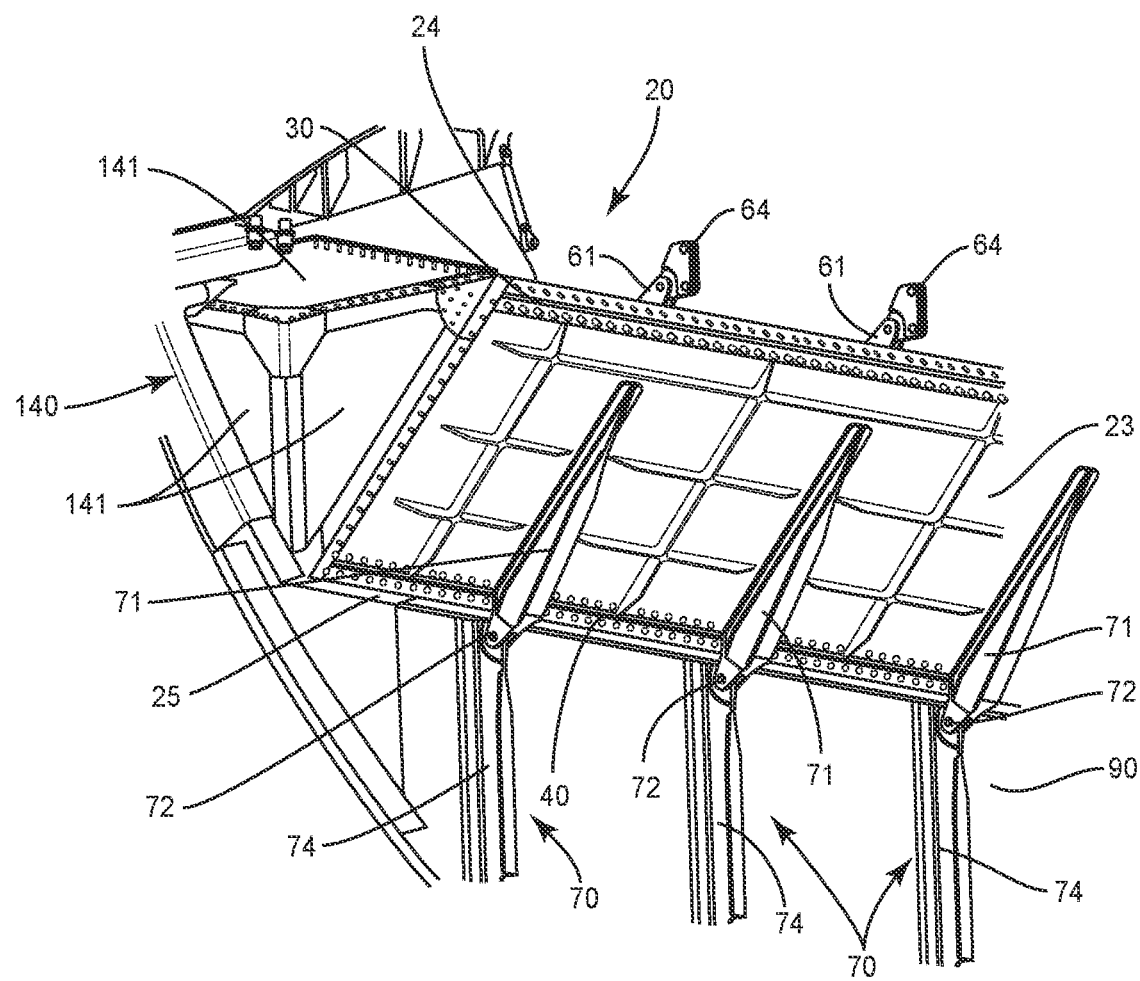
FIG. 7 is a perspective view of second supports connected to a panel and to a bulkhead of an aircraft.

The second support 70 supports a lower section of the panel 20. As illustrated in FIG. 7, each of the second supports 70 includes an arm 71 that is connected to the central section 23 and a mount 74 that is connected to the bulkhead 90. The arm 71 and mount 74 are positioned away from the flexible seal 40 to ensure it does not impede the movement of the panel 20 relative to the bulkhead 90. In one example as illustrated in FIG. 7, the mounts 74 are connected to the face of the bulkhead 90 that is positioned towards the center wing box 80. A connector 72 secures the arm 71 to the mount 74 and provides for the arm 71 to pivot relative to the mount 74. In one example, the connector 72 is a pin that extends through the arm 71 and mount 74. In one example, a spherical bearing provides for additional relative movement between the arm 71 and the mount 74. In one example, the end of the arm 71 is a clevis with a forked shape that extends on opposing sides of the mount 74. The connector 72 extends through the clevis and the mount 74 and provides for the pivoting movement.

The first and second supports 60, 70 are positioned on opposite sides of the panel 20. In one example, the first supports 60 are positioned on a top side of the panel 20 with the arms 61 attached to the first side of the central section 23. The second supports 70 are positioned on a bottom side of the panel 20 with the arms 71 attached to the opposing second side of the central section 23.

Figure 8:
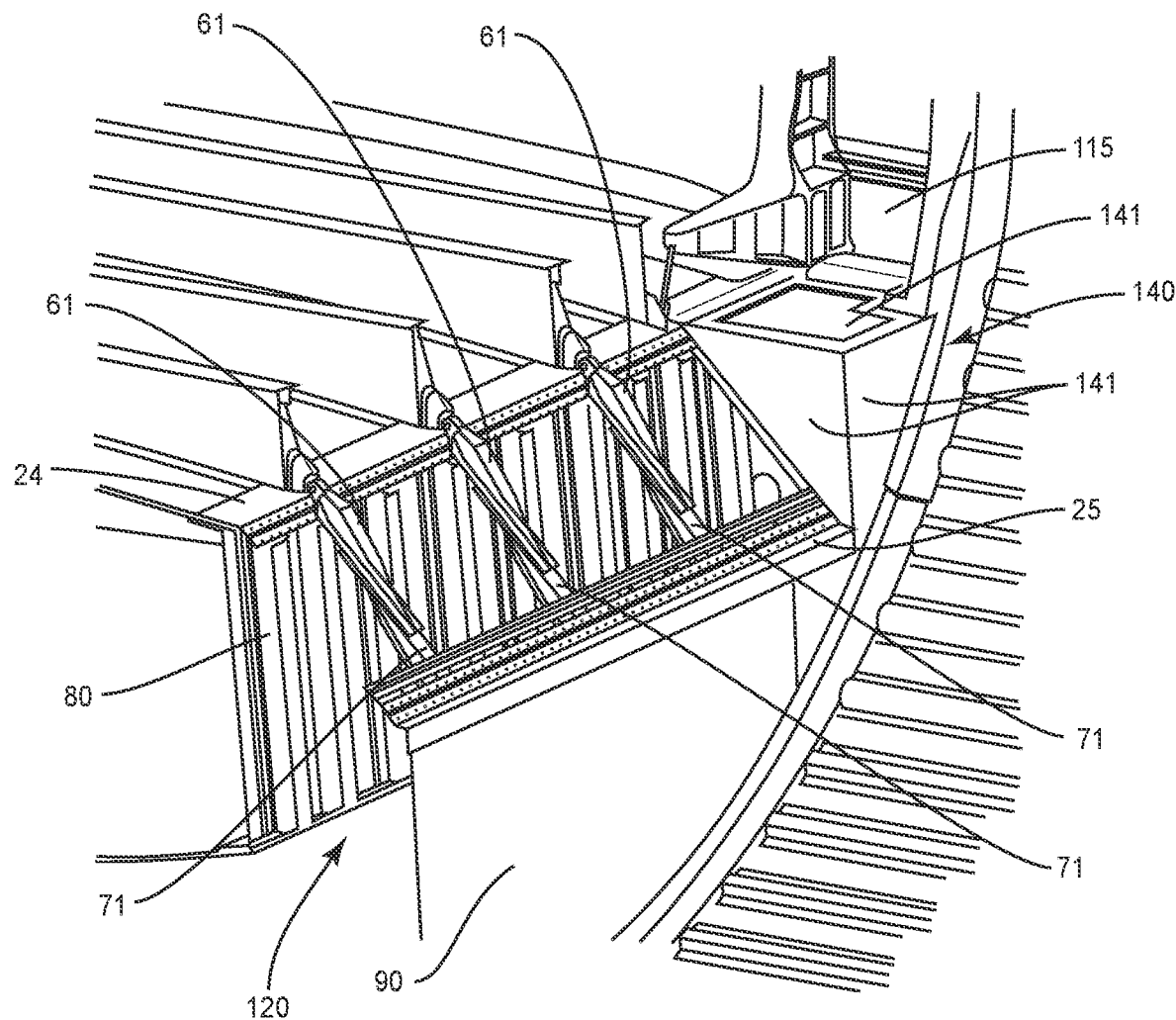
FIG. 8 is a perspective view of paired first and second supports with the panel removed from the drawing for clarity.

The first and second supports 60, 70 are connected to the panel 20 along the width W. The number and spacing of the first and second supports 60, 70 can vary. In one example, first and second supports 60, 70 are evenly spaced across the width of the panel 20. In another example, one or both of the first supports 60 and the second supports 70 are randomly positioned across the width. In one example as illustrated in FIG. 8, the first and second supports 60, 70 are pair together in an overlapping orientation along the width. A first support 60 is attached to the first side of the panel 20 opposite from a second support 70 that is attached to the opposing second side of the panel 20 (the panel 20 is not illustrated in FIG. 8 to show the relative positions of the first and second supports 60, 70). The first and second supports 60, 70 are aligned in pairs along the width of the panel 20. In another example, one or more of the first and second supports 60, 70 are arranged in a non-overlapping orientation.

The first and second supports 60, 70 are attached respectively to the panel 20 in various manners, including but not limited to mechanical fasteners, adhesives, and combinations thereof. The first and second supports 60, 70 can be constructed of various materials, including but not limited to aluminum, titanium, and fiber reinforced composite materials.

Closeout panels 140 are positioned at each of the lateral sides of the panel 20. The closeout panels 140 connect the panel 20 to the skin of the fuselage 101. FIGS. 7 and 8 illustrate closeout panels 140 positioned on the lateral sides of the panel 20. The closeout panels 140 are formed by multiple pressure panels 141 each having a rigid shape. The closeout panels 140 include vertically-aligned pressure panels 141 that are connected together and also connected to one or more of the bulkhead 90 and the skin 115 of the fuselage 101. A horizontally-aligned pressure panel 141 forms a floating panel that is loosely connected to the vertical pressure panels 141 and provides for relative movement with the vertical pressure panels 141, wing 80, and skin 115.

Figure 9:
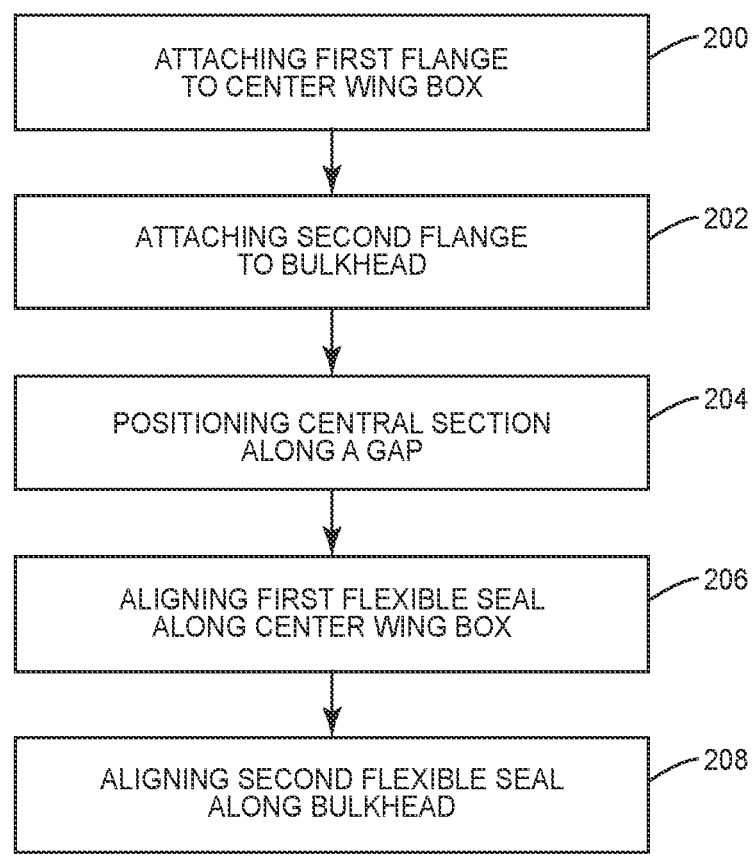
FIG. 9 is a flowchart diagram of a method of connecting a center wing box to a bulkhead of an aircraft.

FIG. 9 illustrates a method of connecting a center wing box 80 to a bulkhead 90 of an aircraft 100. This method includes attaching a first flange 24 of a panel 20 to the center wing box 80 (block 200). A second flange 25 is attached to the bulkhead 90 (block 202). A central section 23 of the panel 20 is positioned along a gap 120 formed between the center wing box 80 and the bulkhead 90 (block 204). A first flexible seal 30 that connects the first flange 24 to the central section 23 is aligned along the center wing box 80 (block 206). A second flexible seal 40 that connects the second flange 25 to the central section 23 is aligned along the bulkhead 90 (block 208).

Figure 10:
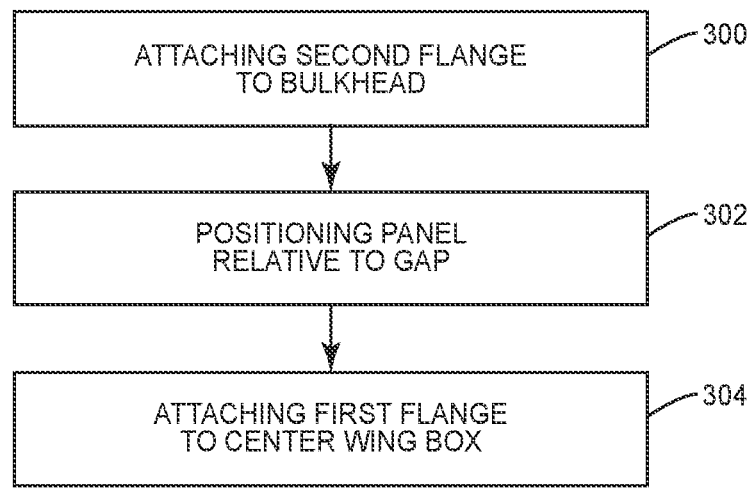
FIG. 10 is a flowchart diagram of a method of connecting a center wing box to a bulkhead of an aircraft.

FIG. 10 illustrates another method of connecting a center wing box 80 to a bulkhead 90. The method includes attaching the second flange 25 to the bulkhead 90 (block 300). The panel 20 is then positioned relative to the gap 120 (block 302). This includes positioning the second flexible seal 40 at the bulkhead 90, the first flexible seal 30 at the center wing box 80, and the central section 23 along the gap 120. The first flange 24 is then attached to the center wing box 80 (block 304).

In the various methods, the order of the attachment and positioning can vary. For example, the first flange 24 can be connected to the center wing box 80 before or after the second flange 25 is attached to the bulkhead 90.

Returning to FIG. 2, the connector 10 is part of the pressure vessel of the aircraft 100. The pressure vessel includes the forward cargo deck 112 and cabin area 106. Pressure under the wing assembly 102 and in the landing gear well 113 is at outside air pressure. The connector 10 further provides a shear capable load path to accommodate movement of the center wing box 80 relative to the bulkhead 90 and/or fuselage 101. Further, the connector 10 allows for the wing assembly 102 to flex with respect to the fuselage 101. The flexible nature of the connector 10 is lighter than an otherwise rigid structure that would resist the movement and would add weight to the aircraft 100.

In one example, a single panel 20 extends across the width of the fuselage 101. In other examples, two or more panels are combined to extend across the width. The different panels 20 can include the same or different shapes and when combined together the separate panels 20 extend across the fuselage 101.

The connector 10 can be used on a variety of aircraft 100. Aircraft 100 include but are not limited to manned aircraft, unmanned aircraft, manned spacecraft, unmanned spacecraft, manned rotorcraft, unmanned rotorcraft, satellites, rockets, missiles, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A connector to connect a center wing box to a bulkhead of an aircraft, the connector comprising:
a panel comprising a first edge positioned at the center wing box, an opposing second edge positioned at the bulkhead, and a central section;
a first flexible seal that extends across the panel and that provides for relative movement between the first edge and the central section;
a second flexible seal that extends across the panel and that provides for relative movement between the second edge and the central section;
a first support mounted to the center wing box to support a first section of the panel;
a second support mounted to the bulkhead to support a second section of the panel; and
wherein the panel is positioned at a downward sloping angle between the first edge and the second edge with the first flexible seal positioned vertically above the second flexible seal.

2. The connector of claim 1, wherein the first flexible seal is spaced apart on the panel from the second flexible seal.

3. The connector of claim 1, wherein each of the first flexible seal and the second flexible seal are constructed from a flexible membrane material.

4. The connector of claim 1, wherein the panel comprises:
a first flange that comprises the first edge and an opposing inner edge with the inner edge connected to the first flexible seal;
a second flange that comprises the second edge and an opposing inner edge with the inner edge connected to the second flexible seal; and
the central section connected to inner edges of each of the first flexible seal and the second flexible seal.

5. The connector of claim 1, further comprising:
the first support comprising a plurality of first stiffener arms attached to the center wing box and the central section, the first stiffener arms configured to prevent interference with the first flexible seal; and
the second support comprising a plurality of second stiffener arms attached to the bulkhead and the central section, the second stiffener arms configured to prevent interference with the second flexible seal.

6. The connector of claim 5, wherein the first and second stiffener arms are aligned in pairs along a length of the panel with the first and second stiffener arms of each of the pairs positioned in an overlapping configuration on opposing sides of the panel.

7. The connector of claim 5, further comprising lug and clevis joints with pins that pivotally connect the first stiffener arms to the center wing box and that pivotally connect the second stiffener arms to the bulkhead.

8. The connector of claim 7, wherein the lug and clevis joints provide for movement of the first stiffener arms relative to the center wing box and the second stiffener arms relative to the bulkhead.

9. The connector of claim 1, further comprising closeout panels positioned on lateral sides of the panel and against the fuselage, the closeout panels comprising pressure panels to structurally connect the panel to the fuselage.

10. A connector to connect a center wing box to a bulkhead of an aircraft, the connector comprising:
a panel sized to extend across a gap formed between the center wing box and the bulkhead, the panel comprising:
a central section sized to extend across the gap, the central section comprising a first edge and an opposing second edge;
a first flange pivotally connected to the first edge at a first flexible seal, the first flange configured to be connected to the center wing box;
a second flange pivotally connected to the second edge at a second flexible seal, the second flange configured to be connected to the bulkhead;
a first support mounted to the center wing box and to a first side of the central section; and
a second support mounted to the bulkhead and to a second side of the central section.

11. The connector of claim 10, wherein each of the first flexible seal and the second flexible seal extend across an entire width of the panel.

12. The connector of claim 11, wherein the first support comprises a plurality of stiffener arms spaced apart across the width of the panel, each of the stiffener arms comprising a first end configured to be connected to the center wing box and an opposing second end positioned at and connected to the central section.

13. The connector of claim 10, wherein the first support is configured to prevent interference with the first flexible seal and the second support is configured to prevent interference with the second flexible seal.

14. The connector of claim 10, wherein each of the first flexible seal and the second flexible seal are straight and are aligned parallel.

15. A method of connecting a center wing box to a bulkhead of an aircraft, the method comprising:
attaching a first flange of a panel to the center wing box;
attaching a second flange of the panel to the bulkhead;
positioning a central section of the panel along a gap formed between the center wing box and the bulkhead;
aligning a first flexible seal that connects the first flange to the central section along the center wing box;
aligning a second flexible seal that connects the second flange to the central section along the bulkhead;
attaching a plurality of first stiffener arms across a width of the panel with each of the first stiffener arms mounted to the center wing box and the central section; and
attaching a plurality of second stiffener arms across the width of the panel with each of the second stiffener arms mounted to the bulkhead and the central section.

16. The method of claim 15, further comprising aligning the central section at a downward angle with the first flange positioned vertically above second flange.

17. The method of claim 15, further comprising attaching the first stiffener arms to a first side of the panel and the second stiffener arms to an opposing second side of the panel.

18. The method of claim 15, wherein attaching the second flange of the panel to the bulkhead comprises attaching the second flange to an upper chord of the bulkhead.

19. The method of claim 15, further comprising attaching the first flange to an upper panel of the center wing box.

20. The connector of claim 10, wherein the central section of the panel is positioned at a downward sloping angle with the first flange being vertically higher than the second flange.

* * * * *